United States Patent [19]

Spadaccini et al.

[11] Patent Number: 5,176,814
[45] Date of Patent: Jan. 5, 1993

[54] METHOD OF COOLING WITH AN ENDOTHERMIC FUEL

[75] Inventors: Louis J. Spadaccini; Pierre J. Marteney, both of Manchester; Meredith B. Colket, III, Simsbury, all of Conn.; Alvin B. Stiles, Wilmington, Del.

[73] Assignee: United Technologies Corporation, Hartford, Conn.

[21] Appl. No.: 701,430

[22] Filed: May 15, 1991

[51] Int. Cl.⁵ .......................... C10G 9/12; B64C 1/00
[52] U.S. Cl. .................. 208/48 Q; 208/159; 244/117 R; 44/302
[58] Field of Search ............ 208/48 Q, 159; 244/117 A, 117; 44/302

[56] References Cited

U.S. PATENT DOCUMENTS

| | | | |
|---|---|---|---|
| 2,655,786 | 10/1953 | Carr | 60/35.4 |
| 2,951,883 | 9/1960 | Kroeper et al. | 208/159 |
| 2,979,293 | 4/1961 | Mount | 244/117 |
| 3,006,142 | 10/1961 | Carr | 44/302 |
| 3,357,916 | 12/1967 | Smith | 208/120 |
| 3,438,602 | 4/1969 | Noddings et al. | 244/135 |
| 3,690,100 | 9/1972 | Wolf et al. | 60/206 |
| 3,855,980 | 12/1974 | Weisz et al. | 123/3 |
| 4,185,456 | 1/1980 | Cummings | 60/39.02 |
| 4,273,304 | 6/1981 | Frosch et al. | 244/117 |

OTHER PUBLICATIONS

Chem Abst 63: 396B–Ritchie et al. 1965.
Chem Abst 75: 14252 Faith et al. 1971.

Primary Examiner—Theodore Morris
Attorney, Agent, or Firm—George J. Romanik

[57] ABSTRACT

A heat source, may be on a high speed vehicle, may be cooled by transferring thermal energy from the heat source to an endothermic fuel decomposition catalyst in order to heat the catalyst to a temperature sufficient to crack or dissociate at least a portion of an endothermic fuel stream. The endothermic fuel is selected from the group consisting of normal paraffinic hydrocarbons and methanol. The heated endothermic fuel decomposition catalyst is contacted with the endothermic fuel stream at a liquid hourly space velocity of at least about 10 $hr^{-1}$ to cause the endothermic fuel stream to crack or dissociate into a reaction product stream.

12 Claims, 2 Drawing Sheets

METHOD OF COOLING WITH AN ENDOTHERMIC FUEL

DESCRIPTION

This invention was made with Government support under contract number F33615-87-C-2744 awarded by the Department of the Air Force. The Government has certain rights in this invention.

CROSS-REFERENCE TO RELATED APPLICATIONS

This application is related to U.S. application Ser. No. 07/701,420, now U.S. Pat. No. 5,151,171 filed on even date herewith entitled "Method of Cooling with an Endothermic Fuel", and U.S. application Ser. No. 07/701.420, pending filed on even date herewith entitled "Endothermic Fuel System".

TECHNICAL FIELD

The present invention relates to a method of using endothermic fuels to cool heat sources, particularly heat sources on high speed aircraft.

BACKGROUND ART

The performance and mission applications of future ramjet and scramjet powered vehicles are highly dependent on protecting the engines and airframe from high heat loads encountered at hypersonic speeds. As aircraft flight speeds increase to the high supersonic and hypersonic regimes, aerodynamic heating becomes increasingly severe and critical demands are placed on the structural and thermal capabilities of the engines and airframe. At flight speeds near Mach 4, the air taken on board these vehicles will be too hot to cool the engines and airframe. Therefore, it will probably be necessary to use the fuel as the primary coolant. To simplify fuel storage and handling considerations, any fuel chosen for this role should have handling and storage characteristics similar to those found in conventional aircraft turbine fuels.

Turbine fuels themselves have long been used as coolants on high performance aircraft because of their capacity to absorb sensible and latent heat. Sensible heat is the heat required to heat the fuel to its boiling point. Latent heat is the heat required to vaporize the fuel. The capacity to absorb sensible and latent heat is referred to as the fuel's physical heat sink. The use of turbine fuels and other conventional liquid hydrocarbon fuels as physical heat sinks, however, is generally limited to moderate temperature applications to avoid fouling the aircraft's cooling or fuel injection systems with deposits formed by fuel decomposition. As a result, these fuels may not be appropriate physical heat sinks for high speed vehicles in which relatively high temperatures will be encountered.

Cryogenic fuels, such as liquid methane and liquid hydrogen, have a sufficient physical heat sink for cooling high speed vehicles and do not present the problems of deposit formation and system fouling. However, they have drawbacks which may render them impractical to use. First, such fuels have a low density, which means large tank volumes, hence large vehicles, are required to hold sufficient fuel. Second, the need to maintain the fuels at cryogenic temperatures presents formidable logistics and safety problems, both on the ground and during flight, especially as compared to conventional aircraft turbine fuels.

An alternate approach would be to use endothermic fuels to provide the needed engine and airframe cooling. Endothermic fuels are fuels which have the capacity to absorb large quantities of physical and chemical heat. Like the turbine and cryogenic fuels discussed above, endothermic fuels are capable of absorbing sensible and latent heat and, therefore, have a physical heat sink. In addition, endothermic fuels are capable of absorbing a heat of reaction to initiate an endothermic decomposition reaction. The capacity to absorb a heat of reaction is referred to as the fuel's chemical heat sink. By combining the physical and chemical heat sinks of an endothermic fuel, the fuel is capable of absorbing two to four times as much heat as fuels which are used only as physical heat sinks and up to twenty times more heat than conventional turbine fuels that are limited to moderate temperatures by their propensity to decompose and form deposits. Furthermore, endothermic fuels offer storage and handling advantages over cryogenic fuels because they are liquids under ambient conditions on the ground and at high altitudes, and have higher densities than cryogenic fuels.

Most work with endothermic fuels has been limited to the selective dehydrogenation of naphthenes. such as methylcyclohexane (MCH). on precious metal catalysts. The decomposition of MCH to toluene and hydrogen over a platinum on alumina catalyst has been demonstrated to provide a chemical heat sink of about 900 Btu/lb, nearly as much as the MCH's physical heat sink of about 1000 Btu/lb. However, the total heat sink of about 1900 Btu/lb may not be adequate to provide the cooling required for very high speed vehicles. Moreover, the cycle life of the platinum/alumina catalyst is apt to be fairly short when operated at the required severe conditions. The MCH must be exceptionally pure because the platinum catalyst is susceptible to sulfur, halide, metals, and particulate poisoning. However, pure MCH has a much lower flash point and much higher vapor pressure than conventional aircraft turbine fuels, necessitating special handling and storage considerations. In addition, the toluene produced by decomposing MCH is a poor fuel for high speed engines because it produces soot during combustion. Soot causes excessive radiative heating of combustor liners and turbine blades, and leads to undesirable visible and infrared emissions.

Accordingly, what is needed in the art is a method of cooling high speed vehicles using an endothermic fuel which provides a high total heat sink, yields products with superior combustion characteristics, does not require precious metal catalysts, and which has handling and storage characteristics similar to those of conventional aircraft turbine fuels.

DISCLOSURE OF THE INVENTION

The present invention is directed to a method of cooling high speed vehicles using an endothermic fuel which provides a high total heat sink, yields products with superior combustion characteristics, does not require precious metal catalysts, and which has handling and storage characteristics similar to those of conventional aircraft turbine fuels.

The invention includes a method of cooling a heat source. Thermal energy from the heat source is transferred to an endothermic fuel decomposition catalyst to heat the catalyst to a temperature sufficient to crack or dissociate at least a portion of an endothermic fuel stream. The endothermic fuel is selected from the group consisting of normal paraffinic hydrocarbons and methanol. The heated endothermic fuel decomposition catalyst is contacted with the endothermic fuel stream at a liquid hourly space velocity of at least 10 hr$^{-1}$ to cause the endothermic fuel stream to crack or dissociate into a reaction product stream. If the endothermic fuel is a normal paraffinic hydrocarbon, the reaction product stream will comprise hydrogen and unsaturated hydrocarbons. If the endothermic fuel is methanol, the reaction product stream will comprise hydrogen and carbon monoxide.

The foregoing and other features and advantages of the present invention will become more apparent from the following description and accompanying drawings.

BEST MODE FOR CARRYING OUT THE INVENTION

Figure 1:
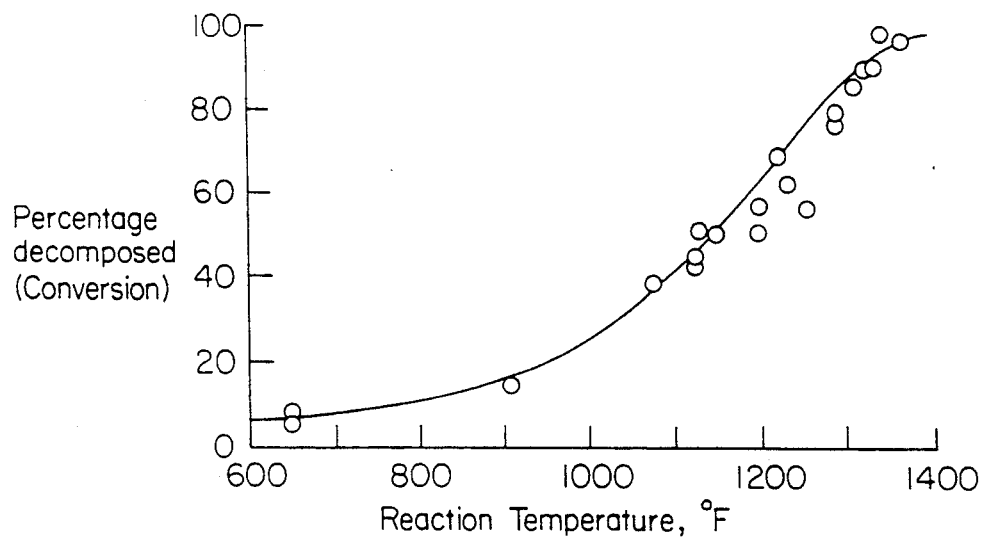
FIG. 1 depicts conversion as a function of reactor temperature for normal heptane cracked over a Pt-Re on alumina catalyst at 20 atm and a LHSV of 150 hr$^{-1}$.

The present invention is directed to a method of cooling a heat source, which may be located on a high speed aircraft, using an endothermic decomposition reaction. An endothermic decomposition reaction is one in which an endothermic fuel is decomposed into reaction products having lower molecular weights than the original endothermic fuel after absorbing a heat of reaction. Typically, endothermic decomposition reactions take place in the gas phase, providing an opportunity to transfer sensible and latent heat to the fuel in addition to a heat of reaction. The two endothermic decomposition reactions contemplated by the present invention are the cracking of normal paraffinic hydrocarbons and the dissociation of methanol.

The normal paraffinic hydrocarbon fuels of the present invention may have two to twenty carbon atoms and may be either pure components or blends of normal paraffins. Blends of normal paraffins are preferred because they can be tailored to provide physical properties, such as flash point, freeze point, and vapor pressure, which are similar to those of conventional aircraft turbine fuels, permitting the endothermic fuel to be stored and handled in the same ways as conventional fuels. Table 1 compares the properties of two endothermic fuels of the present invention, normal heptane and Norpar™ 12, a blend of C$_{10}$ to C$_{13}$ normal paraffins available from Exxon Company, USA (Houston, Tex.), with two conventional aircraft turbine fuels, JP-7 and JP-8, and a prior art endothermic fuel, methylcyclohexane (MCH).

TABLE 1

| | JP-7 | JP-8 | MCH | Heptane | Norpar™ 12 |
|---|---|---|---|---|---|
| Boiling point, °F. | 360–484 | 284–572 | 213 | 209 | 370–426 |

TABLE 1-continued

| | JP-7 | JP-8 | MCH | Heptane | Norpar™ 12 |
|---|---|---|---|---|---|
| Freeze point, °F. | −47 | −53 | −196 | −131 | −20* |
| Viscosity at 68° F., cSt | 2.0 | 1.65 | 0.86 | 0.55 | 1.68 |
| Flash point, °F. | 145 | 100 | 25 | 30 | 156 |
| Specific gravity at 60° F. | 0.79 | 0.81 | 0.77 | 0.68 | 0.75 |
| Vapor pressure at 100° F., psia | 0.02 | 0.15 | 1.6 | 1.6 | 0.8 |
| Critical pressure, psia | 306 | 340 | 504 | 397 | 290* |
| Critical temperature, °F. | 746 | 772 | 570 | 513 | 682* |
| Composition | | | | | |
| Aromatics, vol % | 4 | 20 | | | |
| Naphthenes, vol % | 10 | | 100 | | |
| Paraffins, vol % | 80 | 78 | | 100 | 99 |
| Olefins, vol % | | 2 | | | |
| Sulfur, ppmw | 60 | 500 | <5 | <1 | <1 |

*Estimated Property

Methanol is another endothermic fuel of the present invention because it has a large heat of vaporization, a high heat capacity, and can be endothermically dissociated to provide a high chemical heat sink and thermally stable products. Preferably, methanol will be used as a secondary endothermic fuel to supplement a primary endothermic fuel when high levels of cooling are required.

The endothermic decomposition reactions contemplated by the present invention are gas phase reactions which produce a variety of products. For example, normal paraffins crack to a mixture of hydrogen, unsaturated hydrocarbons, such as acetylene, ethylene, propylene, butene, butadiene, pentadiene, pentene, and pentyne, and saturated hydrocarbons, such as methane, ethane, and butane. Methanol dissociates to a mixture of hydrogen and carbon monoxide with little or no carbon or tar formation.

The decomposition reaction may be catalyzed by any catalyst which will promote the endothermic decomposition of the endothermic fuel. Catalysts which have been found to be effective in catalyzing the cracking of normal paraffins include chromium in the form of chromia; precious metals such as platinum, rhodium, iridium, ruthenium, palladium, and mixtures thereof; and zeolites. Chromium catalysts used for the present invention should contain about 5 weight percent (wt %) to about 33 wt % chromia, and preferably, about 25 wt % to about 30 wt % chromia. Precious metal catalysts used for the present invention should contain about 0.01 wt % to about 5.0 wt % precious metal. Preferably, the precious metal catalysts will contain about 0.1 wt % to about 1.0 wt % precious metal, and most preferably, about 0.3 wt % to about 0.5 wt % precious metal. In addition, the precious metal catalysts may contain promoters such as rhenium, as is known in the art. The chromium and precious metal catalysts may be supported on alumina or similar substrates which may be in the form of granules, extrudates, monolithic honeycombs, or any other conventional form. Suitable chromium catalysts include Houdry Type C, a 30 wt % chromia/alumina catalyst which may be purchased from Air Products and Chemicals Company (Allentown, Pa.). Suitable precious metal catalysts include PR-8, a platinum-rhenium on alumina extrudate which may be purchased from American Cyanamid Company (Wayne, N.J.). Other suitable precious metal catalysts may be purchased from Engelhard Corporation (Iselin, N.J.) and UOP (Des Plaines, Ill.). Preferably, the normal paraffin cracking catalyst will be a zeolite because zeolites are more reactive and produce more unsaturated products and fewer carbonaceous deposits than precious metal catalysts. As a result, higher endotherms are obtainable with zeolites than with precious metal catalysts. The zeolite catalysts useful with the present invention may be faujasites, chabazites, mordenites, silicalites, or any of the other types of zeolite known to catalyze hydrocarbon cracking and should have effective pore diameters of about 3 Å to about 11 Å. Preferably, the zeolite catalysts will have effective pore diameters of about 4 Å to about 8 Å. Suitable zeolite catalysts include Octacat, a faujasite which is available from W. R. Grace & Company (Baltimore, Md.), and SAPO-34, a chabazite which is available from UOP (Des Plaines, Ill.). The zeolites may be supported or stabilized in any suitable manner known in the art. For example, the zeolites may be supported on ceramic granules, extrudates, monoliths, or even metal foil honeycomb structures. Adhesion between the zeolites and support may be facilitated by mixing the zeolite with about 2 wt % to about 20 wt % of a colloidal material. Suitable colloidal materials include ceria; silica, such as Ludox™ LS from E. I. Du Pont de Nemours & Company (Wilmington, Del.); and organic titanium esters, such as Tyzor™ which is also available from Du Pont.

Catalysts containing a mixture of about 35 wt % to about 80 wt % copper oxide and about 10 wt % to about 65 wt % zinc oxide may be used to catalyze the endothermic dissociation of methanol. The catalysts may also contain up to about 25 wt % $Al_2O_3$. Suitable catalysts include L-951, a catalyst comprising 42 wt % CuO, 47 wt % ZnO, and 10% $Al_2O_3$ as a stabilizer, which is available from United Catalyst Incorporated (Louisville, Ky.). The CuO-ZnO catalyst may be impregnated with about 0.5 wt % rhodium to increase reactivity by wetting the catalyst with an aqueous rhodium nitrate solution.

The catalyst should be contacted with the endothermic fuel at reaction conditions which are sufficient to endothermically decompose at least a portion of the fuel stream. The reaction conditions employed by the present invention are much more severe than those typically applied in petroleum refinery catalytic cracking operations because of the volume and weight constraints of aircraft systems. For example, the present invention is capable of cracking normal paraffins and dissociating methanol at a liquid hourly space velocity (LHSV) of at least about 10 $hr^{-1}$, especially about 10 $hr^{-1}$ to about 1000 $hr^{-1}$, as compared to typical petroleum refinery conditions of about 2 $hr^{-1}$. In particular, the present invention has been demonstrated to provide cooling at space velocities of about 20 $hr^{-1}$ to about 700 $hr^{-1}$. Although there is no real preference for a particular space velocity, in some applications space velocities between about 150 $hr^{-1}$ and about 250 $hr^{-1}$ would be acceptable. The reaction pressure may be between about 1 atmosphere (atm) and about 50 atm and, preferably, will be above the fuel's critical pressure to avoid phase changes during the reaction. Because most hydrocarbons and methanol have critical pressures above about 20 atm, the preferred reaction pressure is at least about 20 atm. For cracking normal paraffins, reaction temperatures of between about 1000° F. and about 1500° F. are desirable. In general, temperatures at the lower end of the range provide lower conversions and concomitantly lower chemical heat sinks. Even at the lower temperatures, though, conversions greater than about 60% are achievable. At higher temperatures, conversions greater than 90% can be obtained. Lower conversions might be acceptable if a lower reaction temperature is required because of material considerations or to initiate endothermic cooling at the lower temperatures encountered earlier in a flight program. Preferably, normal paraffins should be cracked at temperatures between about 1200° F. and about 1250° F. in order to achieve high conversions without using excessive temperatures. For dissociating methanol, reaction temperatures of between about 500° F. and about 1200° F. are desirable. Preferably, methanol should be dissociated at temperatures between about 800° F. and about 1000° F. at LHSVs below about 300 $hr^{-1}$.

Thermal energy to supply the heat of reaction to crack or dissociate at least a portion of the endothermic fuel may come from any heat source which is at a suitable temperature and preferably, which requires cooling. The thermal energy is, in effect, recycled to the fuel, increasing the energy which can be extracted from the fuel and improving the efficiency of a system that incorporates the present invention. Preferably, the heat source will be located on an aircraft, such as a high speed aircraft, although the heat source may be ground-based, such as in a gas turbine power generation facility. If the heat source is located on an aircraft, the thermal energy may be supplied by hot gas turbine engine parts, such as combustion chamber walls; airframe components, such as nose and wing leading edges; compressor discharge air; or ram air. The engine and airframe components and hot air may be at temperatures of about 1200° F. or higher. It may be especially advantageous for the thermal energy to be supplied by a part which produces a detectible infrared signature, in which case, cooling the part will reduce the aircraft's infrared signature. The thermal energy may be transferred directly from the heat source or by using a high temperature heat transfer fluid. Heat transfer may be facilitated by using one of the heat exchanger-reactors described in U.S. application Ser. No. 07/701,420, pending filed on even date herewith, which is herein incorporated by reference, or any other suitable heat transfer means known in the art. The thermal energy may also be used to vaporize and heat the fuel to reaction conditions. The amount of thermal energy which can be absorbed by three endothermic fuels of the present invention is shown in Table 2. Data for MCH, a prior art endothermic fuel, is provided for comparison.

TABLE 2

| Fuel | Heat Sink (Btu/lb) | | |
|---|---|---|---|
| | Chemical | Physical | Total |
| MCH | 894 | 1031 | 1925 |
| Methanol | 1214 | 1349 | 2563 |
| Heptane | 1548 | 998 | 2546 |
| Norpar ™ 12 | 1550 | 992 | 2542 |

After the endothermic fuel of the present invention has been cracked or dissociated into reaction products, the reaction products may be combusted in a combustor to produce power. The reaction products formed by cracking normal paraffins, primarily hydrogen and low molecular weight unsaturated hydrocarbons, are particularly good fuels because they mix well with an oxidizer, are easily ignited, burn cleanly, and generate increased energy roughly equivalent to the absorbed heat of reaction. For these reasons, they are actually better fuels than the original endothermic fuel. Moreover, the reaction products produced by the present invention are superior to the products of selective dehydrogenation of naphthenes because the present invention produces only small amounts of aromatics. Aromatics are undesirable fuels because they form soot when burned and produce visible and infrared emissions. The selective dehydrogenation of naphthenes, on the other hand, produces large amounts of aromatics.

EXAMPLE 1

Normal heptane was contacted with a packed bed of Houdry Type C catalyst (Air Products, Allentown, Pa.), a granular 20 wt % chromium on alumina catalyst, at LHSVs up to 50 hr$^{-1}$ and pressures up to 20 atm. At temperatures above 1000° F., a mixture of hydrogen and low molecular weight hydrocarbon products was produced, indicating that cracking rather than dehydrocyclization reactions were predominant. The liquid products contained toluene and a small concentration of MCH, both of which were presumably formed in a secondary dehydrocyclization reaction. At these conditions, heptane conversion was less than 50%.

EXAMPLE 2

Normal heptane was contacted with a packed bed of PR-8 (American Cyanamid, Wayne, N.J.), a 0.3 wt % platinum-0.3 wt % rhenium on alumina extrudate, at a LHSV of 150 hr$^{-1}$, a pressure of 20 atm, and over a range of temperatures up to 1350° F. Analysis of the product gases revealed a large fraction of light, unsaturated hydrocarbons. The major component was ethylene, with acetylene, butadiene, and methane also present. As shown in FIG. 1, significant reaction (a conversion of about 40%) began at about 1100° F. and nearly complete conversion (about 90%) was attained at about 1300° F. The highest endotherm measured was about 1300 Btu/lb at a reactor temperature of about 1350° F. No significant degradation in conversion efficiency or increase in reactor pressure drop was noted after 20 hours of operation.

EXAMPLE 3

Figure 2:
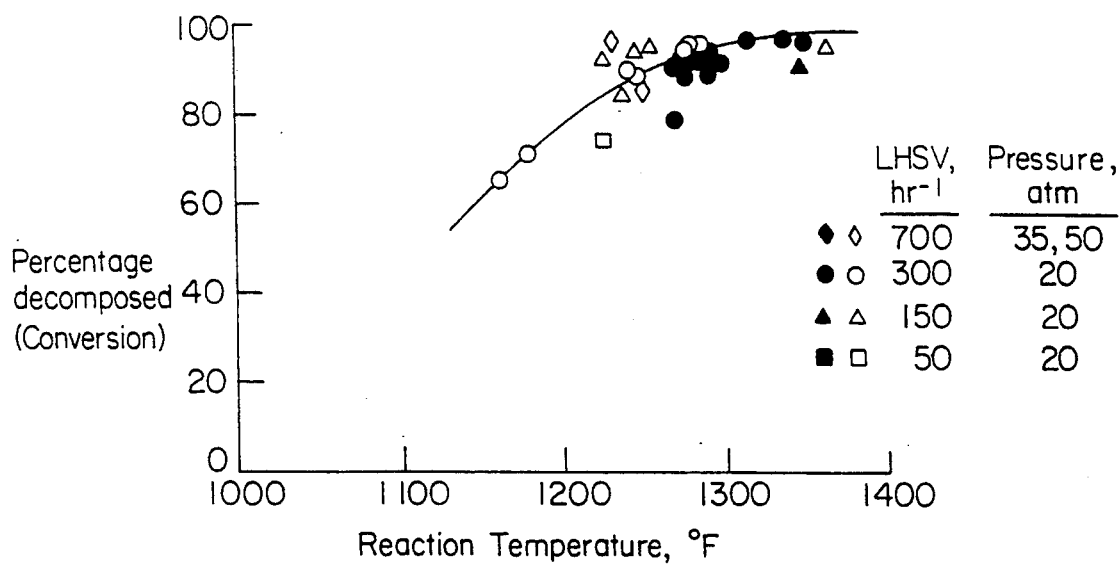
FIG. 2 depicts conversion as a function of reactor temperature for normal heptane cracked over two different zeolite catalysts over a range of pressures and space velocities.

Normal heptane was contacted with beds of two different zeolite catalyst powders, Octacat (W. R. Grace, Baltimore, Md.) and SAPO-34 (UOP, Des Plaines, Ill.), supported in Ludox TM LS (Du Pont, Wilmington, Del.) colloidal silica matrices at LHSVs of 50 hr$^{-1}$ to 700 hr$^{-1}$, pressures up to 50 atm, and over a range of temperatures up to 1350° F. Analysis of the product gases revealed a large fraction of light, unsaturated hydrocarbons. The SAPO-34 catalyst produced more acetylene and light olefinic species than the Octacat catalyst, resulting in a greater endotherm for the SAPO-34 than for the Octacat catalyst. The highest endotherm measured was 1325 Btu/lb at 1300° F. with the SAPO-34 catalyst. The Octacat catalyst produced an endotherm of 1300 Btu/lb at similar conditions. Overall, the endotherms were consistently high and were sustained with increased LHSV and pressure. FIG. 2 shows that both catalysts produced nearly complete conversion (greater than 95%) at temperatures of about 1300° F. Data for Octacat are shown with open symbols, while SAPO-34 data are shown with closed symbols. Table 3 shows the product distribution obtained by cracking normal heptane on an Octacat catalyst at 1300° F., 20 atm, and a LHSV of 300 hr$^{-1}$.

TABLE 3

| Product | Volume % |
|---|---|
| Methane | 2.0 |
| Ethane | 9.0 |
| Butane | 4.0 |
| Heptane | 2.0 |
| Total Paraffins | 17.0 |
| Ethylene/Acetylene | 9.0 |
| Propylene | 9.5 |
| Butene | 10.0 |
| Butadiene | 15.0 |
| Pentadiene | 15.0 |
| Pentene | 15.0 |
| Pentyne | 7.0 |
| Total Olefins and Alkynes | 80.5 |
| Toluene | 1.0 |
| MCH | 1.5 |
| Total Aromatics and Naphthenes | 2.5 |

Each separate catalyst charge was operated for ten hours and was subjected to several startup and shutdown cycles. Post-test scanning electron microscope examination of the catalysts revealed that the aluminum and silicon of the zeolites were still prominent and there was no significant carbon contamination or sulfur, nitrogen, or metals poisoning.

EXAMPLE 4

Figure 3:
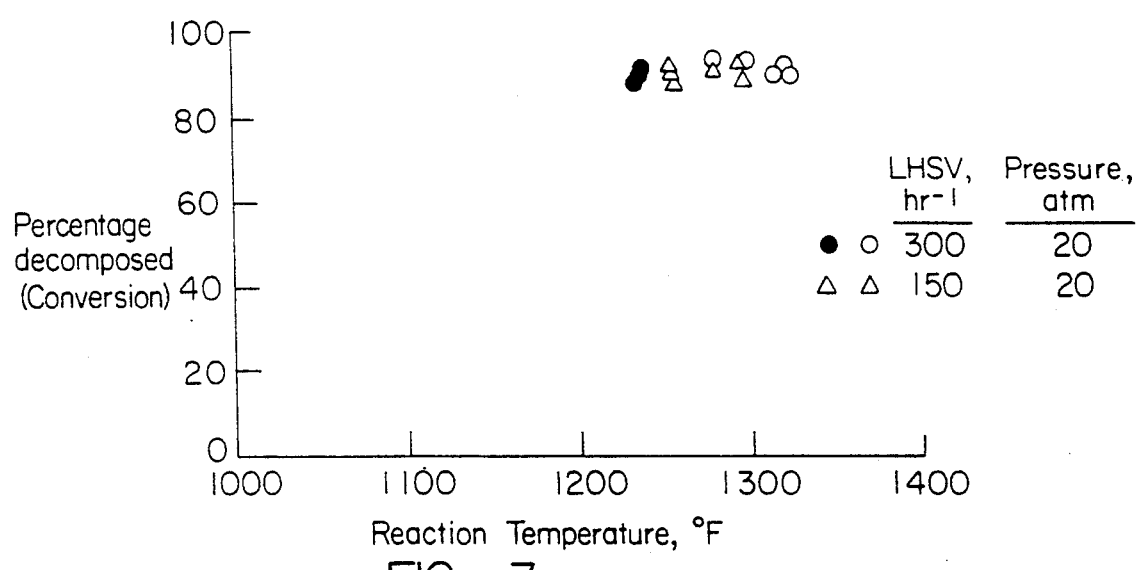
FIG. 3 depicts conversion as a function of reactor temperature for Norpar™ 12 cracked over two different zeolite catalysts over a range of pressures and space velocities.

Norpar TM 12 (Exxon, Houston, Tex.), a commercial blend of $C_{10}$ to $C_{13}$ normal paraffins, was contacted with the same zeolite catalysts used in Example 3 at LHSVs of 150 hr$^{-1}$ and 300 hr$^{-1}$, a pressure of 20 atm, and over a range of temperatures up to 1350° F. The Norpar TM 12 produced a larger fraction of light, unsaturated hydrocarbon products than did the normal heptane, resulting in a higher heat of reaction than the normal heptane. As in Example 3, the SAPO-34 catalyst produced more acetylene and light olefinic species than the Octacat catalyst. As a result, the SAPO-34 catalyst produced a greater endotherm than did the Octacat catalyst. The highest endotherm measured for the Norpar TM 12 was 1550 Btu/lb with the SAPO-34 catalyst at a pressure of 20 atm and a LHSV of 300 hr$^{-1}$. The Octacat catalyst produced an endotherm of 1500 Btu/lb at similar conditions. FIG. 3 shows conversions obtained from Norpar TM after the catalysts had been on stream for about 15 hours. Data for Octacat are shown with open symbols, while SAPO-34 data are shown with closed symbols.

EXAMPLE 5

Methanol was contacted with a L-951 catalyst (United Catalysts, Louisville, Ky.), a 42 wt % CuO-47 wt % ZnO catalyst with 10 wt % alumina added as a stabilizer, which was enhanced with 0.5 wt % rhodium. The rhodium was added to the commercially obtained catalyst by wetting the catalyst with an aqueous solution containing 1.0 wt % rhodium from rhodium nitrate. Various tests were conducted with the catalyst in a packed bed and in a coated metal-foil honeycomb reactor. The metal honeycomb reactor was fabricated by depositing a slurry of catalyst material on a corrugated stainless-steel foil, calcining (drying) the catalyst at 750° F. for 2 hours, and wrapping the foil into a spiral. The resulting honeycomb had an open area of 90%, but only about one-fifth the surface area of the packed bed. Tests were conducted at LHSVs between 40 hr$^{-1}$ and 700 hr$^{-1}$, pressures between 3 atm and 50 atm and temperatures between 600° F. and 1200° F. The catalyst was very active at temperatures above 800° F. and completely converted methanol to hydrogen and carbon monoxide at conditions ranging from 1000° F. and a LHSV of 40 hr$^{-1}$ to 1200° F. and a LHSV of 700 hr$^{-1}$. The packed bed was slightly more reactive than the honeycomb, probably because of the difference in catalyst reactive surface area. The average endotherm measured was 1200 Btu/lb. No significant change in catalyst surface composition and morphology was detected by scanning electron microscope after 20 hours of operation.

All of the fuels of the present invention provide higher chemical heat sinks than the prior art fuels and total heat sinks which are about 25% larger than the prior art fuels. In addition to providing higher heat sinks than the prior art endothermic fuels, the present invention provides several other benefits.

First, the normal paraffinic fuels of the present invention crack to produce primarily olefins and acetylenes, rather than aromatics. Therefore, the reaction products of the present invention are better fuels than produced by the prior art.

Second, the normal paraffinic fuels of the present invention can be blended to produce endothermic fuels with properties similar to those of conventional aircraft turbine fuels. Therefore, the fuels of the present invention are more convenient to store and handle than prior art naphthenic endothermic fuels.

Third, the zeolites which can be used to crack the normal paraffinic fuels of the present invention are not susceptible to sulfur, nitrogen, and metals poisoning. Therefore, the fuels of the present invention do not need to be as pure as the prior art fuels.

It should be understood that the invention is not limited to the particular embodiments shown and described herein, but that various changes and modifications may be made without departing from the spirit or scope of the claimed invention.

We claim:

1. A method of cooling a heat source, comprising:
   (a) transferring thermal energy with heat transfer means from the heat source, which is at a suitable temperature, to an endothermic fuel decomposition catalyst, wherein the catalyst comprises a metal selected from the group consisting of platinum, rhenium, rhodium, iridium, ruthenium, palladium, and mixtures thereof or a zeolite, thereby heating the catalyst to a temperature between about 1000° F. and about 1500° F. to catalytically crack at least a portion of a stream of a normal paraffinic hydrocarbon fuel stream; and
   (b) contacting the heated endothermic fuel decomposition catalyst with the fuel stream at a liquid hourly space velocity of at least about 10 hr$^{-1}$, thereby causing the fuel stream to catalytically crack into a reaction product stream with a conversion of greater than about 60% to produce a total heat sink of at least about 2000 Btu/lb of fuel, wherein the reaction product stream comprises hydrogen and unsaturated hydrocarbons; thereby cooling the heat source to a temperature less than its original temperature.

2. The method of claim 1 further comprising combusting the reaction product stream in a combustor.

3. The method of claim 1 wherein the zeolite is a faujasite, chabazite, mordenite, or silicalite.

4. The method of claim 1 wherein the normal paraffinic hydrocarbon fuel is selected from the group consisting of $C_2$ to $C_{20}$ normal paraffins and blends thereof.

5. The method of claim 1 wherein the endothermic fuel stream is contacted with the heated endothermic fuel decomposition catalyst at a liquid hourly space velocity of about 20 hr$^{-1}$ to about 1000 hr$^{-1}$.

6. The method of claim 1 wherein the heat source is located on an aircraft.

7. A method of cooling high speed vehicle engine and airframe components, comprising:
   (a) transferring thermal energy with heat transfer means from the high speed vehicle engine and airframe components, which are at a suitable temperature, to an endothermic fuel decomposition catalyst that comprises a mixture of copper oxides and zinc oxides, thereby heating the catalyst to a temperature between about 500° F. and about 1200° F. to dissociate at least a portion of a methanol fuel stream; and
   (b) contacting the heated endothermic decomposition catalyst with the fuel stream at a liquid hourly space velocity of at least about 10 hr$^{-1}$, thereby causing the fuel stream to dissociate into a reaction product stream comprising hydrogen and carbon monoxide;
   thereby cooling the high speed vehicle engine and airframe components to a temperature less than their original temperature.

8. The method of claim 7 further comprising combusting the reaction product stream in a combustor.

9. The method of claim 7 wherein the methanol fuel stream is contacted with the heated endothermic fuel decomposition catalyst at a liquid hourly space velocity of about 20 hr$^{-1}$ to about 1000 hr$^{-1}$.

10. A method of cooling high speed vehicle engine and airframe components, comprising:
    (a) transferring thermal energy with heat transfer means from the high speed vehicle engine and airframe components, which are at a suitable temperature, to a zeolite hydrocarbon cracking catalyst with heat transfer means, thereby heating the catalyst to a temperature of about 1000° F. to about 1500° F.; and
    (b) contacting the heated zeolite hydrocarbon cracking catalyst with a normal paraffinic hydrocarbon fuel stream at a liquid hourly space velocity of at least about 10 hr$^{-1}$, thereby causing the fuel stream to catalytically crack into a reaction product stream with a conversion of greater than about 60% to produce a total heat sink of at least about 2000 Btu/lb of fuel, wherein the reaction product stream comprises hydrogen and unsaturated hydrocarbons;
    thereby cooling the high speed vehicle engine and airframe components to a temperature less than their original temperature.

11. The method of claim 10 further comprising combusting the reaction product stream in a combustor.

12. The method of claim 10 wherein the normal paraffinic hydrocarbon fuel is selected from the group consisting of $C_2$ to $C_{20}$ normal paraffins and blends thereof.

* * * * *